(12) United States Patent
Wentworth et al.

(10) Patent No.: US 8,333,845 B2
(45) Date of Patent: Dec. 18, 2012

(54) MULTIPLE MANIFOLD SYSTEM FOR A ROLLOVER VEHICLE WASH SYSTEM

(75) Inventors: Robert J. Wentworth, Farmington Hills, MI (US); Lionel Belanger, Northville, MI (US)

(73) Assignee: Motor City Wash Works, Inc., Northville, MI (US)

( * ) Notice: Subject to any disclaimer, the term of this patent is extended or adjusted under 35 U.S.C. 154(b) by 951 days.

(21) Appl. No.: 12/028,047

(22) Filed: Feb. 8, 2008

(65) Prior Publication Data

US 2009/0199880 A1    Aug. 13, 2009

(51) Int. Cl.
*B60S 3/04*    (2006.01)
(52) U.S. Cl. .......................................... 134/32; 134/123
(58) Field of Classification Search ................ 134/56 R, 134/57 R, 123, 32
See application file for complete search history.

(56) References Cited

U.S. PATENT DOCUMENTS

| | | | | |
|---|---|---|---|---|
| 2,648,342 A | * | 8/1953 | Vani et al. | 134/93 |
| 3,431,580 A | * | 3/1969 | Cirino et al. | 15/302 |
| 3,459,203 A | * | 8/1969 | Pritchard | 134/123 |
| 4,865,058 A | * | 9/1989 | Crotts et al. | 134/45 |
| 5,076,304 A | | 12/1991 | Mathews | |
| 5,161,557 A | | 11/1992 | Scheiter, Jr. | |
| 5,575,852 A | | 11/1996 | Chase | |
| 6,095,438 A | * | 8/2000 | Fratello et al. | 239/432 |
| 6,237,614 B1 | | 5/2001 | Retter | |
| 6,277,207 B1 | | 8/2001 | Gauthier | |
| RE37,830 E | * | 9/2002 | Chase | 118/680 |

* cited by examiner

*Primary Examiner* — Michael Barr
*Assistant Examiner* — Benjamin Osterhout
(74) *Attorney, Agent, or Firm* — Quinn Law Group, PLLC

(57) ABSTRACT

A vehicle washing system including a frame having an entrance and an exit side. The frame linearly reciprocates along a plurality of rails that extend generally in the direction between the entrance side and the exit side to travel over a stationary vehicle. The frame has a first fluid dispensing device located in the half adjacent its entrance side and a second fluid dispensing device located adjacent its exit side. The first and second fluid dispensing devices include a plurality of manifolds each of which is in communication with a supply of fluid to apply fluid to the vehicle. The vehicle washing system includes a control system that is in communication with each of the manifolds in the first and second fluid dispensing devices to selectively and independently control the type of fluid emitted from each of the manifolds and in what order during the vehicle cleaning process.

24 Claims, 4 Drawing Sheets

MULTIPLE MANIFOLD SYSTEM FOR A ROLLOVER VEHICLE WASH SYSTEM

BACKGROUND OF THE INVENTION

1. Field of the Invention

The present invention relates generally to an automotive vehicle washing system. More specifically, the present invention relates to an automotive vehicle washing system generally of the "rollover" type, which includes a plurality of fluid dispensing devices that are configured to travel along a path over the vehicle and each emit fluid thereby improving the efficiency of the vehicle cleaning process.

2. Description of Related Art

The manufacture, sale, and operation of automotive vehicle washing equipment is big business in the United States and many other countries. The term "automotive vehicle washing", as used herein, refers to wet washing the external surfaces of virtually any type of vehicle from ordinary passenger cars to busses, trucks, vans and even train cars and airplanes.

Various types of automotive vehicle washing systems are known. Two basic systems have been developed and are well known. One type of system consists of so called contact types wherein brushes or pads come into physical contact with the vehicle body to perform the washing function. A second type of system widely used is commonly referred to in the art as a non-contact or touchless system. Still further, so-called tunnel or drive through washing systems of both types are well known. Additionally, so-called "rollover" systems of both types wherein the vehicle remains stationary in the wash bay and the system moves with respect to the vehicle to perform the washing operation are also well known.

"Rollover" type washing systems, which move with respect to a stationary vehicle during the wash cycles, have certain advantages over the other types of systems. Several improvements have been sought for in-bay or "rollover" automatic vehicle wash systems to improve the effectiveness of cleaning the entire vehicle surface, to improve operational life of the system, and to increase the speed of the wash process. Still further, improvements have been sought to provide for application of wash chemicals and rinse water effectively to all parts of the vehicle, provide all-weather use of the system and to minimize maintenance requirements for the system while also providing a fast and effective washing cycle.

While these improved systems have yielded satisfactory results, they still suffer from some disadvantages.

SUMMARY OF THE INVENTION

It is therefore an advantage of the present invention to provide a vehicle washing system of the rollover or in-bay type that limits the amount of travel of the machine with respect to the vehicle that is necessary to complete the vehicle cleaning process.

It is another advantage of the present invention to provide a vehicle washing system of the rollover or in-bay type that limits the number of passes of the machine that are necessary to complete the vehicle cleaning process.

It is still another advantage of the present invention to provide a vehicle washing system of the rollover or in-bay type that decreases the cycle time of the machine that is necessary to complete the vehicle cleaning process.

It is still a further advantage of the present invention to provide a vehicle washing system of the rollover or in-bay type that decreases the operational cost to an operator.

It is yet another advantage of the present invention to provide a vehicle washing system of the rollover type that allows for bidirectional operation such that it can begin the process from one of two different starting points, i.e. front of the vehicle or rear of the vehicle.

It is still a further advantage of the present invention to provide a vehicle washing system of the rollover or in-bay type that is configured to allow application of multiple different types of fluids to a vehicle during a single pass of the machine over the vehicle.

It is still another advantage of the present invention to provide a vehicle washing system of the rollover or in-bay type that allows an operator to selectively choose how various types of fluids are applied to a vehicle during the cleaning process to optimize the operation of the vehicle washing system.

In accordance with the above and the other advantages of the present invention, a vehicle washing system that moves with respect to a stationary vehicle, includes a frame having an overhead section and a pair of generally opposing side support sections that define a vehicle bay. The vehicle washing system and the bay includes an entrance side adjacent the location a vehicle stops to initiate the cleaning cycle and an exit side, which is the side closest to the vehicle where it leaves upon completion of the cleaning cycle. The vehicle washing system also includes a plurality of rails that extend generally in the direction between the entrance side and the exit side. The frame linearly reciprocates along the plurality of rails to travel over the vehicle bay and thus over the vehicle disposed therein. The frame has a first fluid dispensing device located in the half of the frame adjacent the entrance side. The first fluid dispensing device includes a plurality of manifolds each of which is in communication with a separate supply of a fluid type and which can dispense fluids separately depending upon the programmed process. The frame has a second fluid dispensing device located in the half of the frame adjacent the exist side. The second fluid dispensing device includes a plurality of manifolds each of which is in communication with a separate supply of a fluid type and which can dispense fluids separately depending upon the programmed process. The vehicle washing system includes a control system that is in communication with each of the manifolds in the first fluid dispensing device and each of the manifolds of the second fluid dispensing device through a plurality of control valves to regulate the type, order, and timing of fluid emitted from each of the manifolds during the vehicle cleaning process.

These and other features and advantages of the present invention will become apparent to one of ordinary skill in the art from the following description of the invention, when viewed in accordance with the accompanying drawings and appended claims.

BRIEF DESCRIPTION OF THE DRAWING(S)

Advantages of the present invention will be readily appreciated as the same becomes better understood by reference to the following detailed description and the accompanying drawings that set forth an exemplary embodiment wherein.

DETAILED DESCRIPTION OF THE EXEMPLARY EMBODIMENT

Figure 1:
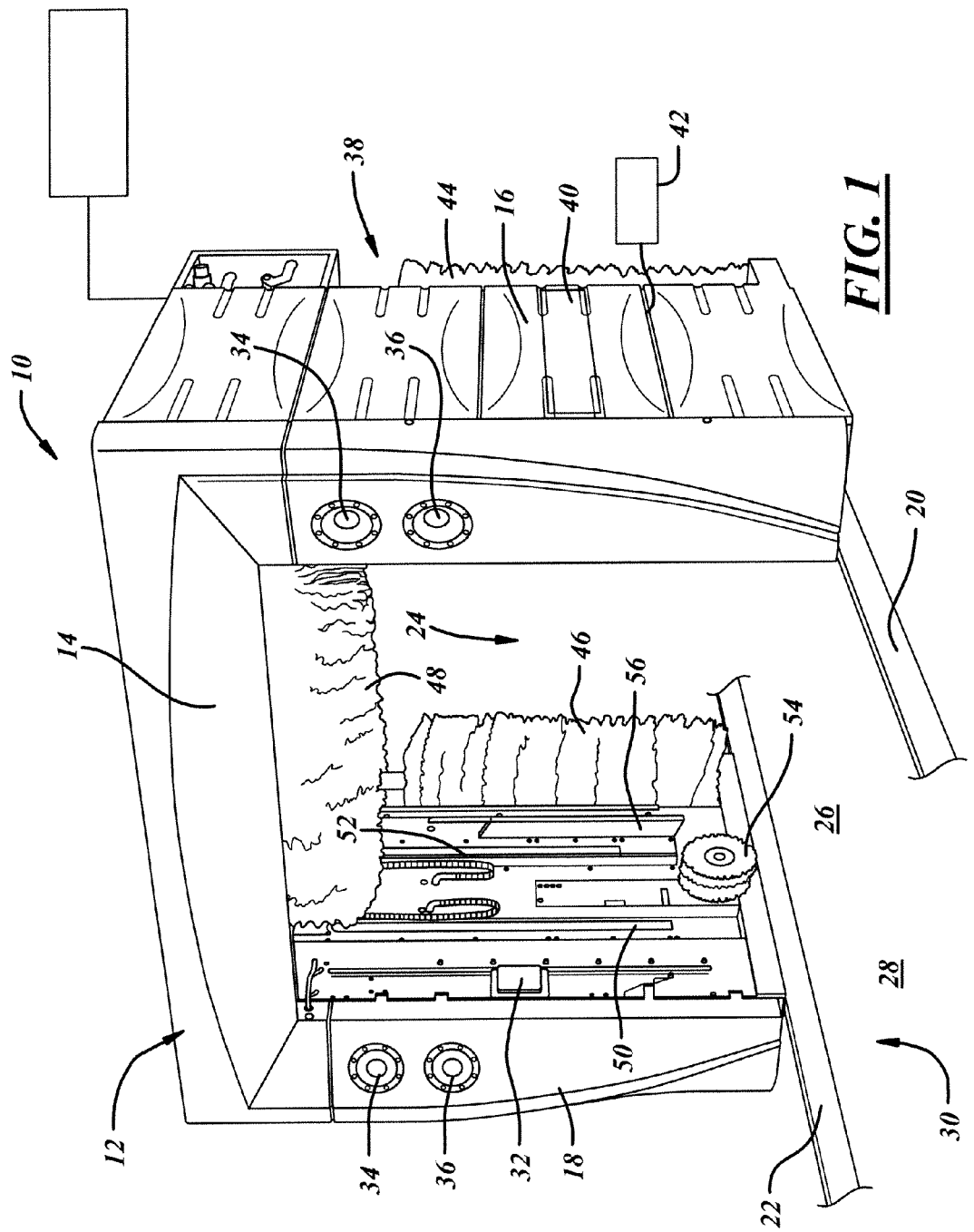
FIG. 1 is a perspective view of a vehicle washing system in a home position as generally viewed from an entrance side of the system in accordance with one embodiment of the present invention.
Figure 2:
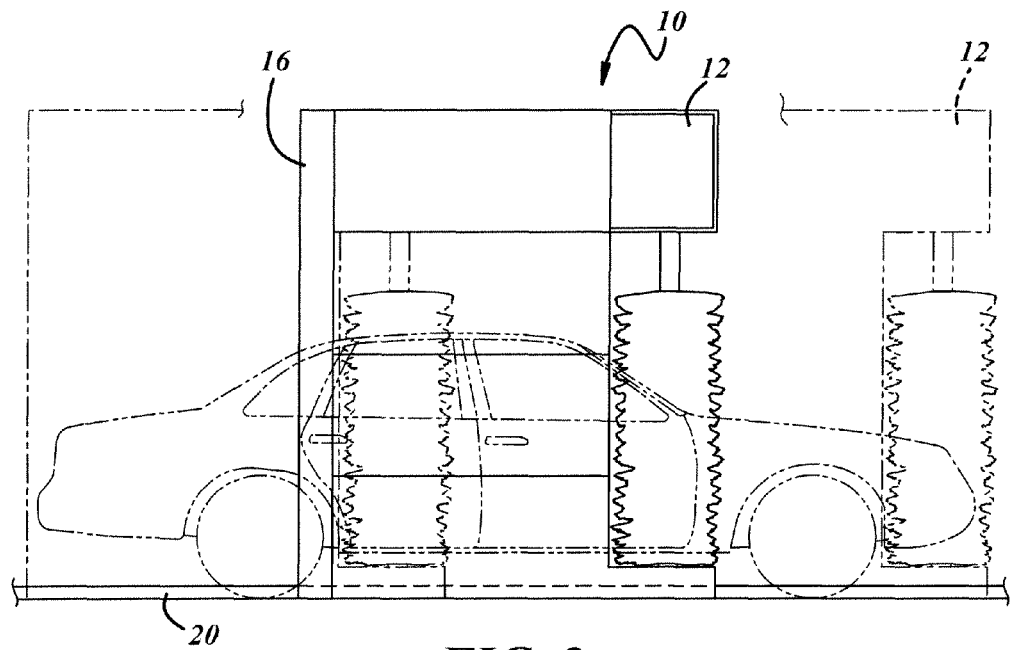
FIG. 2 is a perspective view of a vehicle washing system in an intermediary position during a vehicle washing process as generally viewed from an entrance side of the system in accordance with one embodiment of the present invention.

Referring to FIGS. 1 and 2, a vehicle washing system in accordance with the present invention is illustrated and generally designated by reference number 10. The vehicle washing system 10 is characterized by a linearly traversable frame or gantry 12 comprising an overhead section 14 and a pair of generally opposing side support sections 16, 18. The frame 12, including the overhead section 14 and the side support sections 16, 18, is adapted for linear reciprocating movement along a pair of generally parallel rails 20, 22. The system 10 includes a wash room or bay 24 disposed generally beneath the overhead section 14 and between the side support sections 16, 18, which is intended to receive a vehicle therein.

In one embodiment, the pair of rails 20, 22 are securely mounted on the floor 26 of the wash room or bay 24, such that the frame 12 can move therealong. Alternatively, the pair of rails 20, 22 can be elevated such that they are mounted on the support sections or other support legs spaced on either side of the wash room or bay 26 such that they are not located on the ground. This allows the frame 12 to linearly reciprocate on these elevated rails. It will be understood that more or less rails may be utilized as desired. The wash room or bay 24 includes a vehicle driveway 28 into which a motor vehicle, not shown, may be driven and stopped at a predetermined position so that the system 10 may traverse reciprocally along the rails 20, 22 to carry out the washing cycle, as described in more detail below. As discussed previously, the system 10 is not limited for use with cars only, and can also be utilized in connection with trucks, busses, and the like. It will also be understood that the system 10 can be used to clean a variety of other structures or devices.

To initiate the vehicle cleaning process, a vehicle enters the entrance side 30 of the bay 24. The vehicle must be properly positioned for proper cleaning. To assist in properly positioning the vehicle within the bay 24, in one embodiment, the frame 12 includes a pair of photo eyes 32 that communicate with the driveway 28 to sense the location of a vehicle disposed therein and to provide feedback to the driver as to the location of the vehicle and whether it is properly positioned. As shown, the photo eyes 32 are preferably disposed on each of the side support sections 16, 18 and communicate with a control system, generally designated by reference number 40, to provide a visual display to the driver as to whether the vehicle is properly located within the bay 24. The visual display preferably includes a plurality of signal lights. In one embodiment, the system 10 includes a first signal light 34 to provide indication to the driver that it is safe to enter the vehicle bay 24, such as by flashing a green color. The system 10 includes a second signal light 36 signal light to let the driver know that the vehicle is properly positioned and should stop, such as by flashing a red color. Upon completion of the cleaning process, the first signal light 34 provides indication to the driver, such as by emitting a green light, to let the driver know that it is safe to proceed out the exit side 38 of the bay 24. It will be understood that the control system 40, which communicates with the lights, can provide different indications to the driver of the vehicle as desired, such as emitting different colors or providing different visual displays. For example, the visual display can provide an intermediate indication to the driver as they are entering the bay 24. It will also be understood that a variety of other visual indicators besides signal lights can also be utilized.

It will be understood that instead of photo eyes, other suitable sensing devices to sense the location of the vehicle can also be utilized. For example, the wash room or bay 26 could include a pair of guides that are mounted to the vehicle driveway 28, which are intended to contact the front wheels of the vehicle to properly position it. Alternatively, treadle can be mounted to the floor of the bay 24 near the forward extremity of the guides. When depressed by the front tire of a vehicle, the treadle generates an electrical signal providing input data to the control system 40 to communicate with the visual display to provide stop and go cues to the driver of the vehicle.

The foregoing and following description assumes that the vehicle is driven into the bay 28, properly located and driven forward out of the bay by a driver at the proper times. As persons skilled in the art will know, the wash bay 28 may instead be equipped with a conveyer (not shown) to position the vehicle.

As shown, the system 10 also includes a plurality of components for effectively completing the vehicle washing or cleaning process. These components are common to conventional rollover machines and thus are only discussed briefly below. Specifically, the system 10 includes a programmable interface 42, that allows the operator of the system 10 to select the specific wash packages and allows for ready customization of the washing process, as discussed in more detail below. Additionally, the system 10 includes a pair of side brushes 44, 46 that are rotatable in order to assist in the cleaning process. The system 10 also includes a rotatable upper brush 48 that is positioned in vertical slots 50, 52, to allow it to be raised or lowered as required to assist in the cleaning process of the vehicle. The brushes 44, 46, 48 all preferably includes soft cotton material. However, other suitable materials may be utilized as desired. Additionally, a soap or foam is preferably conveyed to the brushes such that the brushes apply the soap or foam to the vehicle. Moreover, it will be understood that more or less brushes may be utilized.

Further, a wheel brush 54 is also included on each of the side support sections 16, 18 for cleaning the wheels of the vehicle located in the bay 28. The operation of these brushes is well known and the specifics of their operation need not be discussed in detail. Additionally, the wheel brush 54 operates in accordance with high pressure water, foam and other chemicals, the application of which is discussed in more detail below. Moreover, the system 10 also includes a drying device 56, such as a contoured dryer to assist in drying the surfaces of the vehicle. It will be understood that instead of a contact brush system, the system can also include components that have it operate as a touchless system, as will be understood by one of ordinary skill in the art.

Figure 3:
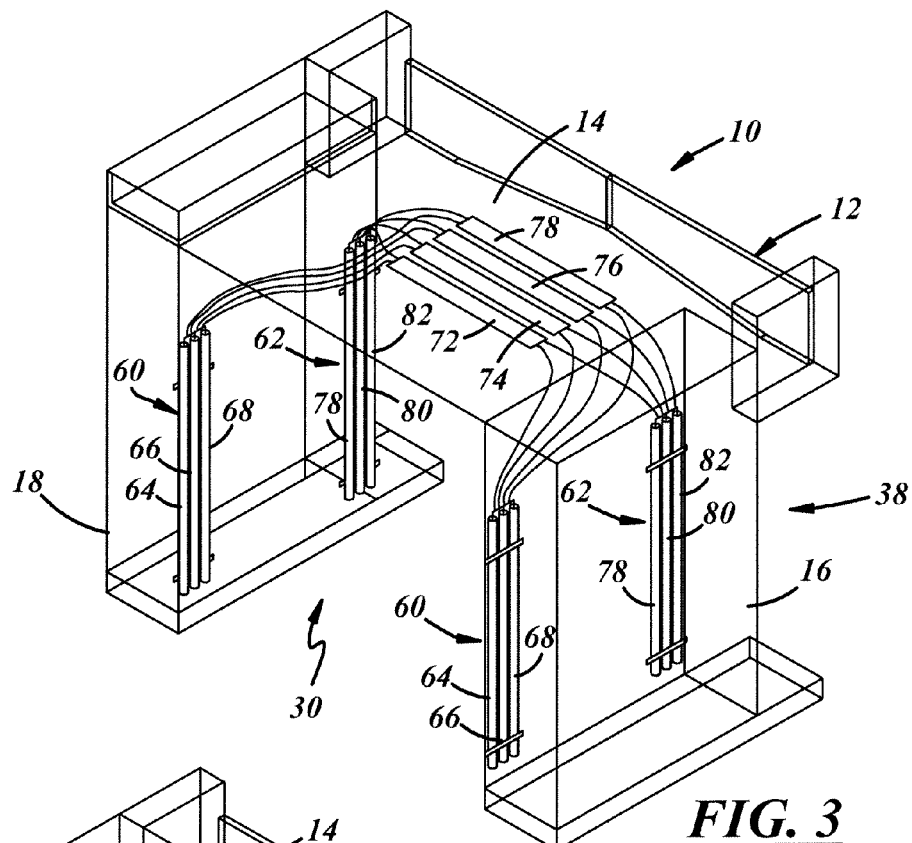
FIG. 3 is a schematic illustration of a vehicle washing system with a plurality of fluid dispensing devices located in an entrance half of the machine and a plurality of fluid dispending devices located in an exit half of the machine in accordance with one embodiment of the present invention.
Figure 4:
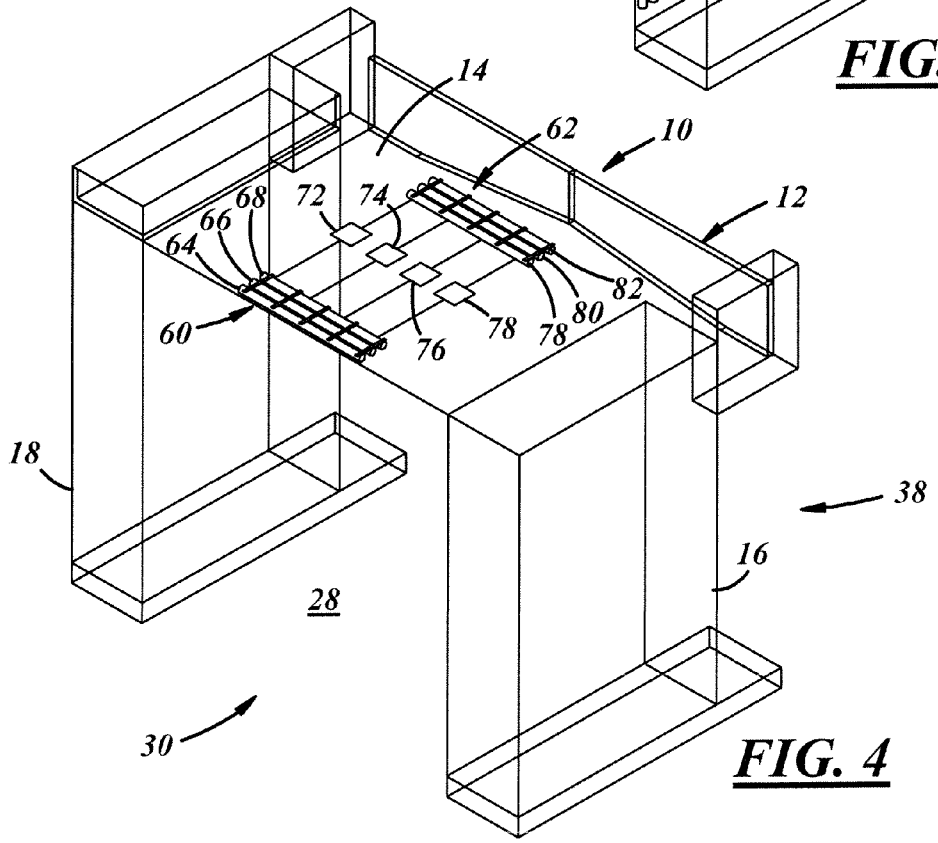
FIG. 4 is a schematic illustration of a vehicle washing system with a plurality of fluid dispensing devices located in an entrance half of the machine and a plurality of fluid dispending devices located in an exit half of the machine in accordance with another embodiment of the present invention.

Turning now to FIGS. 3 and 4, which illustrate the mechanism for delivering fluid to the vehicle to assist in the vehicle cleaning process in accordance with one embodiment of the present invention. Specifically, as shown in FIG. 3, the system 10 includes a first or entrance fluid delivery mechanism 60 that is located on the overhead section 14 of the frame 12 adjacent the entrance side 30 of the bay 24.

In one embodiment, the entrance fluid delivery mechanism 60 is mounted to each of the side support sections 16, 18. As also shown, the system 10 also includes a second or exit fluid delivery mechanism 62 that is located on the overhead section 14 of the frame 12 adjacent the exit side 38 of the bay 24. The exit delivery mechanism 62 is also mounted to each of the side support sections 16, 18.

The entrance fluid delivery mechanism 60 includes a plurality of individual manifolds 64, 66, 68. Each of the entrance manifolds 64, 66, 68 includes a plurality of nozzles or fluid emitting devices disposed thereon for emitting fluid therethrough onto the vehicle during the vehicle cleaning process. Each of the entrance manifolds 64, 66, 68 is in communication with a respective one of fluid supplies 70, 72, 74, 76 that each contain a different fluid type to convey the selected fluid through a fluid conduit to each of the entrance manifolds 64, 66, 68 and directed through the appropriate manifold by suitable valving. It will be understood by one of ordinary skill in the art that the entrance fluid delivery mechanism 60 can include more or less manifolds as desired. The entrance fluid delivery mechanism 60 is in communication with the control system 40 to regulate the flow of fluid through each of the entrance manifolds at the proper time during the cycle, such as by controlling the valving.

The exit fluid delivery mechanism 62 includes a plurality of individual exit manifolds 78, 80, 82. Each of the exit manifolds 78, 80, 82 includes a plurality of individual nozzles or fluid emitting devices disposed thereon for emitting fluid therethrough onto the vehicle during the vehicle cleaning process. Each of the exit manifolds 78, 80, 82 is in communication with a respective one of the fluid supplies 70, 72, 74, 76 that each contain a different fluid type to convey the selected fluid through a fluid conduit to each of the exit manifolds 78, 80, 82 and directed through the appropriate manifold by suitable valving. It will be understood by one of ordinary skill in the art that the exit fluid delivery mechanism 62 can include more or less manifolds as desired. The exit fluid delivery mechanism 62 is in communication with the control system 40 to regulate the flow of fluid through each of the exit manifolds at the proper time during the cycle, such as through controlling the valving.

As shown, one of the entrance manifolds and one of the exit manifolds are each in communication with a single supply such that they serve as a pair to deliver a single type of fluid. Each of the entrance manifolds and the exit manifolds are preferably picked up with a single fluid supply.

FIG. 4 illustrates another embodiment of the system 10, which includes a first or entrance fluid delivery mechanism 60 that is secured to the frame 12 adjacent the entrance side 30 of the bay 24 and a second or exit fluid delivery mechanism 62 that is secured to the frame 12 adjacent the exit side 38 of the bay 24. In this embodiment, both the entrance fluid delivery mechanism 60 and the exit fluid delivery mechanism 62 are mounted to the overhead section 14.

The entrance fluid delivery mechanism 60 in this embodiment has the same configuration as the entrance fluid delivery mechanism 60 discussed above in FIG. 3. Specifically, the entrance fluid mechanism 60 includes a plurality of entrance manifolds 64, 66, 68 for emitting fluid to the vehicle in the same manner discussed above. Each of the entrance manifolds 64, 66, 68 is in communication with a respective one of the fluid supplies 70, 72, 74, 76 to deliver of the appropriate fluid at the proper time during the cleaning or washing cycle as controlled by the control system 40 and suitable valving. The exit fluid delivery mechanism 62 in this embodiment has the same configuration as the exit fluid delivery mechanism 62 discussed above in FIG. 3. Specifically, the exit fluid mechanism 62 includes a plurality of exit manifolds 78, 80, 82 for emitting fluid to the vehicle in the same manner discussed above. Each of the exit manifolds 78, 80, 82 is in communication with a respective one of the fluid supplies 70, 72, 74, 76 for delivery of the appropriate fluid at the proper time during the washing cycle as controlled by the control system 40 and suitable valving.

It will be understood that the system can include an entrance and exit fluid delivery mechanism 60, 62 on both the overhead section 14 and the side support sections 16, 18 instead of on only one or the other. In fact, in one preferred embodiment, each of the manifolds in the entrance and exit delivery mechanism 60, 62 include one piece arches that apply fluid to the entire outer surface of the vehicle, namely the top and both sides at the same time. Further, more then two fluid delivery mechanism, may also be included. For example, a middle or intermediate fluid delivery mechanism may also be included, as discussed in more detail below. Additionally, each fluid delivery mechanism can include more or less manifolds as desired.

The inclusion of entrance and exit fluid delivery mechanism 60, 62 allow multiple manifolds to supply or apply fluid to a vehicle during any given pass of the frame at the same time, i.e. when it travels in one direction over the vehicle. For purposes of this application, a pass is defined as travel of the device over the length of the vehicle or the extent of travel path in one direction. Thus, the present invention allows for different fluids to be applied sequentially to the vehicle from both the entrance and/or exit fluid delivery mechanism 60, 62 during one pass of the frame 12 over the vehicle.

Describing an exemplary process or procedure for a vehicle cleaning process will assist in understanding the operation of and advantages provided by the present invention. For example, in accordance with a typical vehicle cleaning process, a vehicle drives into the entrance side of the rollover machine. A sequence of steps and procedures are then performed in a certain order to complete the vehicle washing process. These steps are well known in the industry and are carried out in a certain order as is also well know. An example of these steps and an illustrated sequence are discussed below. First, a pre-soak chemical is applied to the vehicle. This can either by sprayed onto the vehicle or applied manually by a brush or the like. Next, high pressure water is applied to the vehicle to assist in loosening and/or removing dirt from the vehicle. Thereafter, soap and friction are applied to the vehicle, such as by a variety of different cloth brushes. A rinse, such as water, is then applied to the vehicle to wash away soap and any remaining debris. Next, a pay wax can be applied to the vehicle, if desired by a user. This is followed by a drying agent and then a spot free rinse. Finally, a drying step to remove any excess fluid from the vehicle is performed. It will be understood that the types of steps as well as their sequence can vary and is not critical to the present invention. The sequence of steps and their operation is controlled by a control system and is programmable through a user interface, as is well known in the art.

Figure 5:
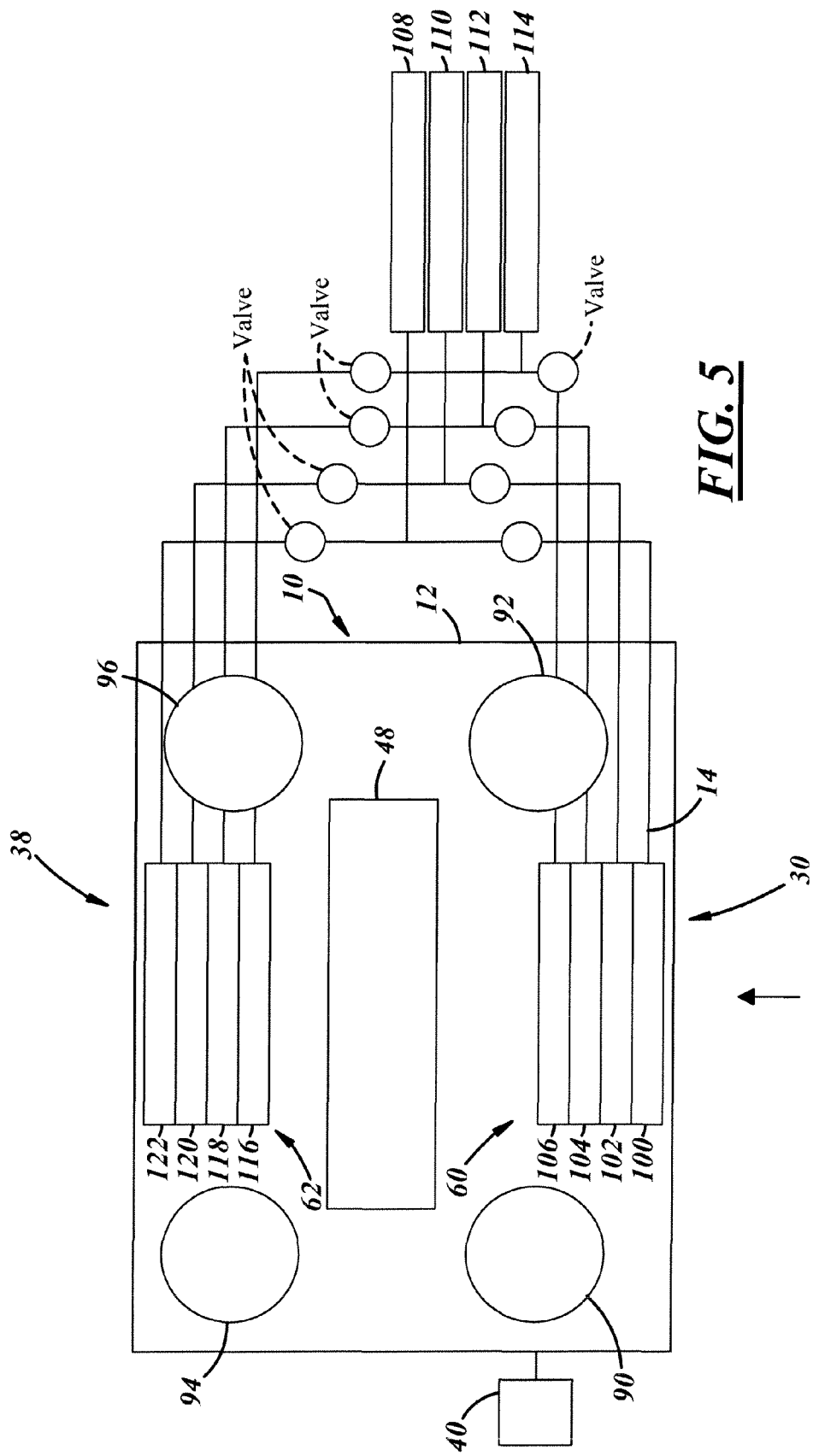
FIG. 5 is a schematic illustration of the configuration of a plurality of fluid dispensing devices in accordance with one embodiment of the present invention.

The present invention provides advantages over prior rollover systems, as discussed above, by allowing the steps necessary to perform the vehicle washing process to be completed with less machine travel (i.e. less passes over the vehicle) and thus decreased cycle time. Referring now to FIG. 5, which illustrates an exemplary embodiment of the present invention. As shown in this schematic illustration, the system 10 includes an entrance fluid delivery mechanism 60 and an exit fluid delivery mechanism 62. The system 10 also includes a pair of opposing rocker rolls 90, 92 located near the entrance side 30 of the bay 24. Additionally, the system 10 includes a pair of opposing side rolls 94, 96 located near the exit side 38 of the bay 24. The system 10 further includes an upper brush 48.

As shown, the entrance fluid delivery mechanism 60 includes four manifolds 100, 102, 104, 106. The manifold 100 is in communication with a supply 108 of a first fluid type to deliver it to the vehicle as dictated by the control system 40. In this embodiment, the first fluid type is a spot free fluid. The manifold 102 is in communication with a supply 110 of a second fluid type to deliver it to the vehicle as dictated by the control system 40. In this embodiment, the second fluid type is wax. The manifold 104 is in communication with a supply 112 of a third fluid type to deliver it to the vehicle as dictated by the control system 40. In this embodiment, the third fluid type is a second or premium wax. The manifold 106 is in communication with a supply 114 of a fourth fluid type to deliver it to the vehicle as dictated by the control system 40. In this embodiment, the fourth fluid type is a rinse. As will be understood, each of the manifolds 100, 102, 104, 106 includes nozzles or other devices for spraying or emitting fluid therefrom. A pair of two way valves 126, 128 are in communication with each respective manifold to allow and shut off the flow of fluid thereto. Again, more or less manifolds may be utilized as desired. Further, the manifolds can also be in communication with different types of fluid as desired. Moreover, the manifolds are configured to apply fluid to the entire surface of the vehicle (tops and both sides).

The exit fluid delivery mechanism 62 also includes four manifolds 116, 118, 120, 122. These manifolds are each in communication with the same supplies of fluid as the manifolds of the entrance fluid delivery mechanism 60 to deliver these fluids to the vehicle as directed by the control system 40. Specifically, the manifold 116, is in communication with the supply 114 of the first fluid type (a rinse). The manifold 118 is in communication with the supply 112 of the second fluid type (premium wax). The manifold 120 is in communication with the supply 110 of the third fluid type (first wax). The manifold 122 is in communication with the supply 108 of the fourth fluid type (spot free fluid). The pair of two way valves 126, 128 are in communication with each respective manifold to allow and shut off the flow of fluid thereto. As will be understood, each of the manifolds 116, 118, 120, 122 includes nozzles or other devices for spraying or emitting fluid therefrom. Again, more or less manifolds may be utilized as desired. Further, the manifolds can also be in communication with different types of fluid as desired. Moreover, these manifolds are also configured to apply fluid to the entire surface of the vehicle (tops and both sides).

As discussed above, a single entrance manifold and a single exit manifold are in communication with a single fluid supply. For example, the manifold 100 and 122 are in communication with one fluid supply 108 containing one fluid type. The manifolds 102 and 120 are each in communication with a single fluid supply 110, which contains another fluid type. The manifolds 104 and 118 are each in communication with one fluid supply 112, which contains another fluid type. The manifolds 106 and 116 are each in communication with one fluid supply 114. By this configuration each fluid supply communicates with a pair of manifolds; an entrance side manifold and an exit side manifold. Thus, an entrance side manifold is paired off with an exit side manifold which each communicate with a supply of a single fluid type.

In operation, a vehicle enters the entrance side 30 of the vehicle bay 24. Once the vehicle is properly positioned as determined by the control system 40, the vehicle cleaning process starts. The timing and sequence of steps is also controlled by a control system 40. First, in accordance with one embodiment, the frame 12 begins to move linearly along rails in the direction away from the exit side 38 of the bay 24. As the frame 12 begins to move, a high pressure rinse is emitted from the entrance manifold 106 such that it traverses the entire vehicle. In the same pass of the frame 12 over the vehicle, but contacting the vehicle after the high pressure rinse, each of the rocker rolls 90, 92 contact the vehicle and provide a supply of soap or foam thereto that is emitted from the rolls, as is known in the art, to clean selected portions of the vehicle. The upper brush 48 similarly contacts the upper part of the vehicle and provides a supply of soap or foam thereto to assist in the cleaning process. Additionally, the side rolls 94, 96 contact the vehicle and provide a supply of soap thereto. As set forth above, the number, types and placements of the rolls and brushes is not critical. More or less rolls or brushes may be utilized. Additionally, brushes that perform different functions or are intended to contact different parts of the vehicle may be utilized. Further, as discussed above, the system 10 may operate as a touchless system without any contacting rolls or brushes. In the same pass of the frame 12 over the vehicle, the exit manifold 116 can emit a supply of rinse to the vehicle to wash off the soap and any debris.

After the frame 12 has reached its length of travel over the vehicle away from the exit side 38 of the bay 24 and completed one pass, it then linearly moves along rails over the vehicle toward the exit side 38 and the initial starting position of the frame 12 (another pass). In this pass, the exit manifold 120 applies a first wax to the vehicle. In the same pass, the exit manifold 118 applies a second premium wax to the vehicle after application of the first wax, if selected by the driver. It will be understood that the application of the second premium wax coat can also be applied by the entrance manifold 104. Next, in the same pass, the entrance manifold 100 applies the spot free fluid onto the vehicle. In order to further decrease the number of passes, the first wax can be applied to the vehicle by the exit manifold 120 during the first pass of the frame 12 over the vehicle.

Next, the vehicle is subjected to a drying process as the frame 12 travels again away from the exit side 38 of the bay 24. In accordance with the drying process, a drying device is positioned to blow air onto the vehicle to remove and/or evaporate any excess fluid. Once the drying process is complete, the frame 12 returns to its initial position and the driver of the vehicle is signaled by the machine that it is safe to exit the system 10. Alternative features and sequences may be utilized, as desired. For example, a device for applying a coating to the tire of the vehicle may also be included adjacent the exit side 38 of the device 10 as will be understood by one of ordinary skill in the art.

As can be seen by providing two fluid delivery mechanism, one adjacent the entrance of the machine 60 and one near the exit of the machine 62, each of which includes the same fluids to be applied to the vehicle, the system 10 can operate in a bidirectional manner such that multiple fluids can be applied to the vehicle in any given pass. For example, in the embodiments of FIGS. 3 and 4, the entrance and exit fluid delivery devices each include three manifolds. In these embodiments, the manifolds are in communication with three different types of fluids such as a rinse, a supply of wax, and a supply of spot free fluid. It will also be understood that the principles and structures described herein can be applied to any fluid spray system including, by way of example, painting, prepping and corrosion-proofing. Further, because of the bidirectional nature of the system 10, the cleaning process may begin regardless of whether the frame 12 is in the home position or removed from the home position.

Figure 6:
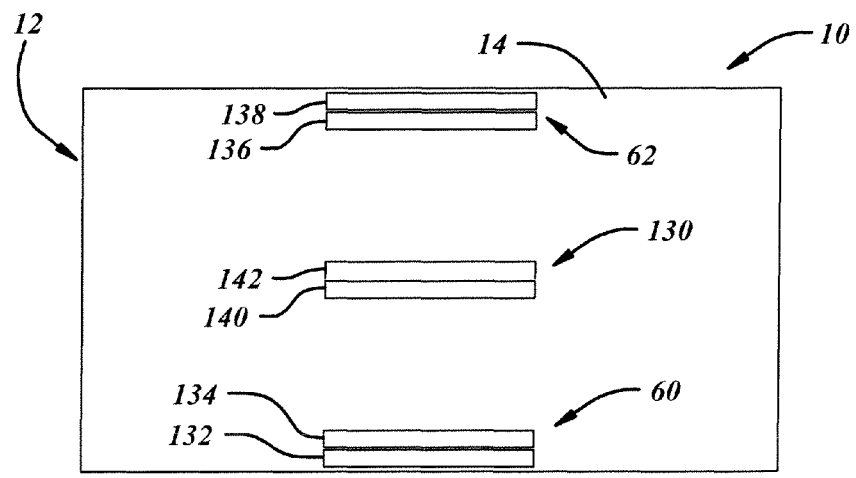
FIG. 6 is a schematic illustration of the configuration of a plurality of fluid dispensing devices in accordance with another embodiment of the present invention.

FIG. 6 illustrates another embodiment of the present invention. As shown, in FIG. 6, the system 10 includes an entrance fluid delivery mechanism 60 and an exit fluid delivery mechanism 62. The system 10 also includes an intermediate fluid delivery mechanism 130. The entrance fluid delivery mechanism 60 includes a manifold 132 that is in communication with a supply of spot free fluid to emit that onto the vehicle as directed by the control system 40. The entrance fluid delivery mechanism 60 also includes a manifold 134 that is in communication with a supply of rinse fluid to emit that onto the vehicle as directed by the control system 40.

The exit fluid delivery mechanism 62 includes an exit manifold 136 that is in communication with a supply of rinse fluid to emit that onto the vehicle as directed by the control system 40. The exit fluid delivery mechanism also includes an exit manifold 138 that is in communication with a supply of spot free fluid to emit that onto the vehicle as directed by the control system 40.

The intermediate fluid delivery mechanism 130 includes an intermediate manifold 140 that is in communication with a supply of premium wax to apply it onto a vehicle as directed by the control system 40. The intermediate fluid delivery mechanism 130 also includes an intermediate manifold 142 that is in communication with a supply of a wax to apply it onto a vehicle as directed by the control system 40.

In operation, the use of the three fluid delivery mechanism 60, 62, 130 each including multiple manifolds allow multiple fluids to be applied to the vehicle during any given pass of the frame 12 over the vehicle. While only a few exemplary embodiments have been specifically discussed, it will be understood that a variety of other configurations can be utilized that properly order the chemicals to be applied to a vehicle such that multiple fluids can be applied to the vehicle in any give pass of the frame 12 of the vehicle. For example, it will be understood that more or less groups of manifolds may be utilized. Also, their location on the frame 12 may also vary. Additionally, the application of fluid through the manifolds to the vehicle may also vary or vary the types of fluids contained in the fluid supplies.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for cleaning a stationary vehicle where the system moves with respect to the stationary vehicle, comprising:
   a frame structure, including at least an overhead section, said frame structure having an entrance side and an exit side;
   a plurality of guide rails in communication with said frame structure to allow said frame structure to linearly reciprocate over the vehicle;
   a first entrance fluid delivery device located on said frame structure in a half adjacent said entrance side;
   a first exit fluid delivery device located on said frame structure in a half adjacent said exit side;
   said first entrance fluid delivery device and said first exit fluid delivery device each being in communication with a first fluid type;
   a second entrance fluid delivery device located on said frame structure in a half adjacent said entrance side and a second exit fluid delivery device located on said frame structure in a half adjacent said exit side each in communication with a second fluid type, wherein said first fluid type is different than said second fluid type;
   a control system in communication with each of said first and second entrance fluid delivery devices and said first and second exit fluid delivery devices to selectively and independently control the flow of fluid through each of said first and second entrance fluid delivery devices and said first and second exit fluid delivery devices;
   wherein said control system selectively emits said first fluid type from either said first entrance fluid delivery device or said first exit fluid delivery device during a pass of said frame in either direction thereof and selectively emits said second fluid type from either said second entrance fluid delivery device or said second exit fluid delivery device during the same pass of said frame in either direction thereof;
   wherein said control system is configured to emit fluid from one of said first entrance fluid delivery device or said second entrance fluid delivery device simultaneously with fluid from one of said first exit fluid delivery device or said second exit fluid delivery device in order to limit the number of passes of said frame structure over the vehicle.

2. The system of claim 1, further comprising:
   a third entrance fluid delivery device and a third exit fluid delivery device each in communication with a single supply of a third fluid type.

3. The system of claim 1, wherein said frame structure includes a pair of side support structures that each have said first and second entrance fluid delivery devices located in a half adjacent said entrance side and said first and second exit fluid delivery devices located in a half adjacent said exit side.

4. The system of claim 1, wherein said first and second entrance fluid delivery devices and said first and second exit fluid delivery devices are fluid manifolds.

5. A system for applying fluid to a vehicle as part of a vehicle wash process where the system moves with respect to the stationary vehicle, comprising:
   a singular reciprocating frame structure having at least an overhead section, said frame structure having an entrance side where the vehicle enters to initiate the vehicle wash process and an exit side where the vehicle leaves upon completion of the vehicle wash process;
   a plurality of guide rails in communication with said frame structure to allow it to move over the vehicle generally in a direction between said entrance side and said exit side;
   a plurality of entrance manifolds coupled to said frame structure in a half adjacent said entrance side;
   a plurality of exit manifolds coupled to said frame structure in a half adjacent said exit side;
   a first pair of manifolds consisting of one of said plurality of entrance manifolds and one of said plurality of exit manifolds, which together form a first fluid delivery device, said first fluid delivery device is in communication with a supply of a first fluid type;
   a second pair of manifolds consisting of another of said plurality of entrance manifolds and another of said plurality of exit manifolds, which together form a second fluid delivery device, said second fluid delivery device is in communication with a supply of a second fluid type, which is different than said first fluid type;

a control system in communication with each of said first fluid delivery device and said second fluid delivery device to selectively and independently regulate the application of fluid through each of said first fluid delivery device and said second fluid delivery device as necessary to minimize the number of passes of said frame structure over the vehicle that are necessary to complete the vehicle wash process; and wherein said control system is configured to selectively emit said first fluid type from either said entrance manifold or said exit manifold of said first pair of manifolds during a pass of said frame in either direction thereof and simultaneously emit said second fluid type from either said entrance manifold or said exit manifold of said second pair of manifolds during the same pass of said frame in either direction thereof;

wherein said control system can apply fluid to the vehicle in a predetermined sequence to limit the number of passes of said frame structure over the vehicle.

6. The system of claim 5, wherein said plurality of guide rails are secured to a floor where the stationary vehicle rests during the vehicle wash process.

7. The system of claim 5, wherein said frame structure includes a pair of side support structures that are generally aligned with and extend generally perpendicular with respect to said overhead section.

8. The system of claim 7, wherein each of said pair of side support structures includes a plurality of entrance manifolds coupled thereto adjacent an entrance side thereof and a plurality of exit manifolds coupled thereto adjacent an exit side thereof.

9. A method of cleaning a stationary vehicle where the vehicle wash system moves with respect to stationary vehicle, comprising:

providing a reciprocating frame structure having an overhead section, said frame structure having an entrance side and an exit side;

locating the vehicle properly with respect to said frame structure;

coupling a plurality of entrance fluid delivery manifolds to said frame structure in a half adjacent said entrance side and a plurality of exit fluid delivery manifolds to said frame structure in a half adjacent said exit side, wherein the number of entrance fluid delivery manifolds and the number of exit fluid delivery manifolds coupled to the frame are the same;

pairing one of said plurality of entrance fluid delivery manifolds and one of said plurality of exit fluid delivery manifolds in communication with a supply of a first fluid type;

pairing another of said plurality of entrance fluid delivery manifolds and another of said plurality of exit fluid delivery manifolds in communication with a supply of a second fluid type;

a control system configured for predetermining a sequence by which to apply fluid from said plurality of entrance manifolds and said plurality of exit fluids to minimize the number of passes required by said frame structure to complete the vehicle wash process; and applying fluid from said supply of said first fluid type to the vehicle during a pass of the frame thereover from said one of said plurality of entrance fluid delivery manifolds while simultaneously applying fluid from one of said plurality of exit fluid delivery manifolds;

whereby fluid is applied to the vehicle in a predetermined sequence to limit the number of passes of said frame structure over the vehicle.

10. The method of claim 9, further comprising:

applying fluid from said second supply of fluid to the vehicle during a pass of the frame thereover from said another of said plurality of entrance delivery manifolds or said another of said plurality of exit fluid delivery manifolds.

11. A system for cleaning a stationary vehicle where the system moves with respect to the vehicle, comprising:

a frame structure for performing a predetermined sequence of steps on the vehicle as said frame structure linearly reciprocates in a forward and rearward direction over the vehicle;

a plurality of guide rails in communication with said frame structure to allow said frame structure to linearly reciprocate;

a first fluid delivery device, including a plurality of first fluid delivery manifolds, each of said plurality of first fluid delivery manifolds being in communication with a different supply of fluid;

a second fluid delivery device, including a plurality of second fluid delivery manifolds, each of said plurality of second fluid delivery manifolds being in communication with a different supply of fluid;

a control system in communication with each of said first fluid delivery device and said second fluid delivery device, said control system being configured to emit a first fluid from one of said plurality of first fluid delivery manifolds simultaneously with a second fluid from one of said plurality of said second fluid delivery modules during a single pass of said frame over the vehicle, wherein said first fluid is different than said second fluid;

wherein said control system applies fluids from said supplies of fluid via said first fluid delivery device and said second fluid delivery device to the vehicle in a predetermined sequence to minimize the number of passes of said frame structure over the vehicle.

12. The system of claim 11, wherein said frame structure includes an overhead section and a pair of side supports that form a unitary structure.

13. The system of claim 11, wherein said first fluid delivery device is located on said frame structure in a half adjacent an entrance side thereof.

14. The system of claim 13, wherein said second fluid delivery device is located on said frame structure in a half adjacent an exit side thereof.

15. The system of claim 12, wherein said first fluid delivery device and said second fluid delivery device are both located on said overhead structure.

16. The system of claim 12, wherein said first fluid delivery device and said second fluid delivery device are both located on said pair of side supports.

17. The system of claim 11, wherein said first fluid delivery device includes three separate manifolds that are each in communication with a separate supply of fluid.

18. The system of claim 17, wherein said second fluid delivery device includes three separate manifolds that are each in communication with a separate supply of fluid.

19. The system of claim 18, wherein said first fluid delivery device and second fluid delivery device are in communication with a supply of water, a supply of soap and a supply of wax.

20. A system for cleaning a stationary vehicle where the system moves with respect to a stationary vehicle, comprising:

a frame structure having an entrance side and an exit side and including an overhead section;

at least one guide structure in communication with said frame structure to allow said frame structure to linearly reciprocate over the vehicle;

an entrance fluid delivery device in communication with a plurality of different fluid supplies;

an exit fluid delivery device in communication with said plurality of different fluid supplies; and a control system in communication with each of said entrance fluid delivery device and said exit fluid delivery device, said control system being configured to emit a first fluid from said entrance fluid delivery device simultaneously with a second fluid from said exit fluid delivery device during a single pass of said frame over the vehicle;

wherein said first fluid and said second fluid are different fluid types.

21. The system of claim 20, wherein said entrance fluid delivery device includes a plurality of entrance manifolds that are each in communication with said plurality of different fluid supplies; and a plurality of exit manifolds that are each in communication with said plurality of different fluid supplies.

22. The system of claim 21, wherein said plurality of entrance manifolds and said plurality of exit manifolds are disposed on said overhead section.

23. The system of claim 22, wherein said frame includes a pair of side support structures.

24. The system of claim 23, further comprising:

a side entrance delivery device disposed on at least one of said side support structures; and a side exit delivery device disposed on at least one of said side support structures.

* * * * *